United States Patent [19]
Ryoo

[11] Patent Number: 5,890,087
[45] Date of Patent: Mar. 30, 1999

[54] AUTOMATIC TRANSMISSION CONTROL METHOD USING MAP DATA

[75] Inventor: In-Suk Ryoo, Seoul, Rep. of Korea

[73] Assignee: Kia Motors Corporation, Seoul, Rep. of Korea

[21] Appl. No.: 691,644

[22] Filed: Aug. 2, 1996

[30] Foreign Application Priority Data

Jun. 28, 1996 [KR] Rep. of Korea .................. 1996 25015

[51] Int. Cl.⁶ ........................... F16H 59/66; B60K 41/28
[52] U.S. Cl. .............................. 701/51; 701/65; 701/208; 701/217
[58] Field of Search ................................. 701/51, 55, 56, 701/62, 64, 65, 207, 217, 220, 208

[56] References Cited

U.S. PATENT DOCUMENTS

| | | | |
|---|---|---|---|
| 3,881,368 | 5/1975 | Furuhashi et al. ...................... | 477/119 |
| 4,713,764 | 12/1987 | Klatt .......................................... | 701/65 |
| 5,148,721 | 9/1992 | Anan et al. ................................ | 701/53 |
| 5,154,250 | 10/1992 | Murai ........................................ | 180/179 |
| 5,598,335 | 1/1997 | You ........................................... | 701/65 |

*Primary Examiner*—Tan Q. Nguyen

[57] ABSTRACT

An automatic transmission control method using map data includes the steps of: operating a map in said CD-ROM; mapping said magnetic position of said vehicle by using said earth magnetism sensor; measuring a climbing angle of said vehicle from an angle sensor mounted in said vehicle; judging whether said climbing angle is beyond a constant angle θ; judging conditions of said approaching road, such as a position of a peak, when said climbing angle is greater than said constant angle θ; maintaining a current gear by confirming a condition for keeping a transmission, or changing a gear by performing a shift in transmission; and repeating said steps by mapping again said magnetic position of the vehicle. As described above, in the automatic transmission control method using map data, the navigation system previously senses a state of the approaching road by using the earth magnetism sensor and the map data, and the TCU prevents an unnecessary transmission by confirming a condition for keeping the transmission.

3 Claims, 2 Drawing Sheets

| A/T | 3SPEED | 4SPEED | 3SPEED |
|---|---|---|---|
| M/T | 3SPEED | | |

| A/T | 3SPEED | 4SPEED | 3SPEED |
|---|---|---|---|
| M/T | 3SPEED | | |

AUTOMATIC TRANSMISSION CONTROL METHOD USING MAP DATA

FIELD OF THE INVENTION

The present invention relates to an automatic transmission control method using map data, and more particularly to an automatic transmission control method which prevents an unnecessary shifting of the transmission by sensing conditions of an approaching road.

PRIOR ART

Referring to FIGS. 1 and 2, there is shown a sloped and curved road. For a vehicle with a manual transmission, it is maintained at a third speed according the driver's intent when driving on the road. In contrast, for a vehicle with an automatic transmission, there is a shift from third speed to fourth speed by automatic shifting. More specifically, when a vehicle with an automatic transmission is driving at a speed of about 60 km/h, there occurs a shift between the 3 and 4 speed ranges. If the vehicle is traveling along an upward slope, there is a downward shift from fourth to third speed and, if the vehicle is traveling on a downward slope, there is a upward shift from third to fourth speed.

In FIG. 3, there is illustrated a shift map data according to the transmission conditions of FIGS. 1 and 2. A transmission point is disposed at a first point A as the vehicle travels at an upward slope. The transmission point then shifts to a second point B when the slope of the road changes to a downward slope, thereby indicating an upward shift in transmission. After traveling the downward sloped road, the driver steps on the accelerator upon approaching another portion of the road with an upward slope. The transmission thus shifts from point B to a third point C, thereby indicating a downward shift in transmission. For an automatic transmission vehicle, whenever the slope of the road changes, the transmission must shift accordingly.

The result of frequent speed shifts, however, is an increase in fuel-consumption and discomfort to the driver.

SUMMARY OF THE INVENTION

It is an object of the present invention to provide an automatic transmission control method which prevents an unnecessary shift of the transmission by sensing conditions of an approaching road through the use of both an earth magnetism sensor and map data.

In order to achieve the above-stated object, the automatic transmission control method using map data is provided which includes the steps of:

operating a map stored on a compact disk read-only memory (hereinafter referred to as a CD-ROM);

mapping a magnetic position of a vehicle by using an earth magnetism sensor;

measuring a climbing angle of the vehicle from an angle sensor mounted in the vehicle;

judging whether the climbing angle is beyond a constant angle θ;

judging conditions of the approaching road, such as a position of a peak, when the climbing angle is greater than the constant angle θ;

maintaining a current gear by confirming a condition for keeping a transmission, or performing a shift in transmission range; and repeating the above-mentioned operations by mapping again the magnetic position of the vehicle.

BRIEF DESCRIPTION OF THE ATTACHED DRAWINGS

These and other features, aspects, and advantages of the present invention will become better understood with regard to the following description, appended claims, and accompanying drawings wherein:

DETAILED DESCRIPTION OF THE INVENTION

A detailed description of the present invention will now be made referring to the accompanying drawings.

Figure 1:
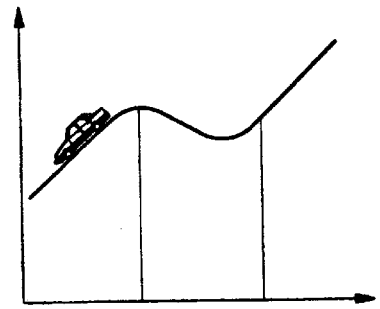
FIG. 1 shows a gear shifting state on a sloped road according to the Prior Art, for both an automatic transmission and a manual transmission vehicle.
Figure 2:
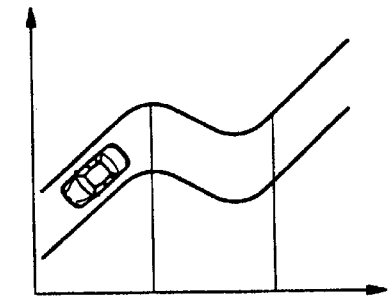
FIG. 2 is a plan view of the sloped road in accordance with FIG. 1.
Figure 3:
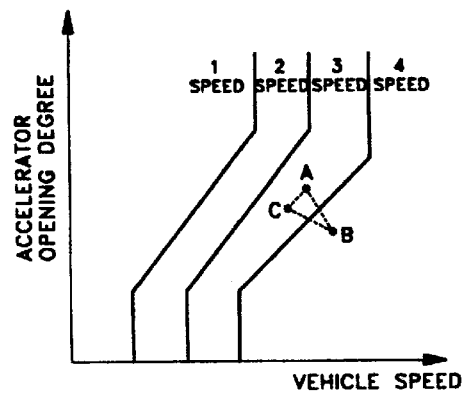
FIG. 3 is a shift map indicating the gear shifting state of FIG. 1.
Figure 4:
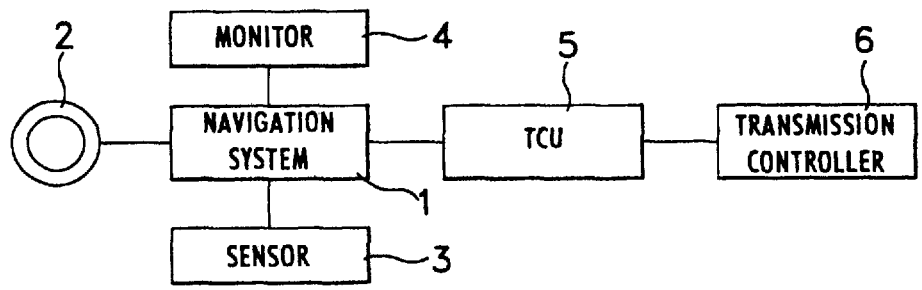
FIG. 4 is a block diagram indicating the components of an automatic transmission control system in accordance with a preferred embodiment of the present invention.

Referring to FIG. 4, a navigation system 1 receives map data from a CD-ROM 2 and a signal of a magnetic position of a vehicle from an earth magnetism sensor 3, and then displays the data and the signal on a monitor 4. In addition, the navigation system 1 transmits the conditions of an approaching road to a transmission control unit 5 (hereinafter referred to as TCU) which controls a transmission controller 6 in response to these conditions.

It should be noted that the navigation system 1, TCU 5, and transmission controller 6 are well known to those skilled in the art. The transmission controller 6, for example, may be a solenoid.

Figure 5:
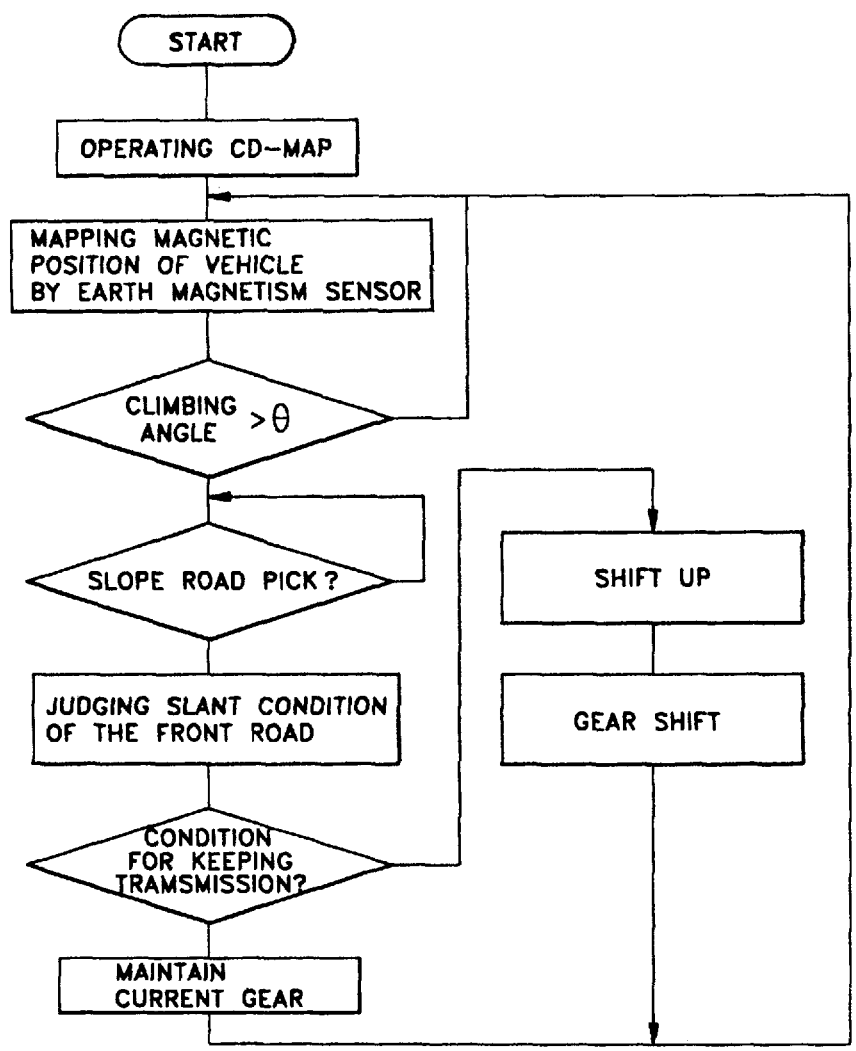
FIG. 5 is a flow chart illustrating the steps involved for said automatic transmission control system in accordance with a preferred embodiment of the present invention.

Referring to FIG. 5, a flow chart for the automatic transmission control method using map data is shown. At the starting point, CD-ROM 2 is operated wherein a map stored on the CD-ROM is read. Thereafter, a position of a vehicle is mapped by using an earth magnetism sensor.

As a vehicle climbs an upward sloping road, a climbing angle of the vehicle is measured from an angle sensor mounted in the vehicle and the measured angle is compared with a predetermined constant angle θ.

If the measured climbing angle is beyond the constant angle θ, the transmission control unit judges slant conditions of an approaching road, such as the position of a peak.

When the peak of an upward sloping road approaches, a current gear is maintained. On the other hand, when the climbing road approaches, a gear is shifted downwards. Thereafter, the above-mentioned operations are repeated by mapping again the magnetic position of the vehicle.

As described above, in the automatic transmission control method using map data, the navigation system 1 previously senses a state of the front road by using the earth magnetism sensor 3 and the map data, and the TCU 5 prevents unnecessary shifts of the transmission by confirming a condition for keeping the transmission, thereby efficiently driving the vehicle.

Although the preferred embodiment of the present invention has been disclosed for illustrative purposes, those skilled in the art will appreciate that various modifications, additions and substitutions are possible, without departing from the scope and spirit of the present invention as disclosed in the accompanying claims.

What is claimed is:

1. An automatic transmission control method using map data in an automatic transmission controller wherein a navigation system receives said map data from a compact disk read-only memory (CD-ROM), receives a signal of a magnetic position of a vehicle from an earth magnetism sensor, and transmits both a state and a condition of an approaching road to a transmission control unit (TCU) which controls the automatic transmission controller according to said condition, comprising the steps of:

operating a map stored in said CD-ROM;

mapping said magnetic position of said vehicle by using said earth magnetism sensor;

measuring a climbing angle of said vehicle from an angle sensor mounted on said vehicle;

determining whether said climbing angle is greater than a predetermined constant angle θ;

determining conditions of said approaching road when said climbing angle is greater than said constant angle θ;

maintaining a current gear or changing a gear by performing a shift in transmission depending on said road conditions; and repeating said steps by mapping again said magnetic position of the vehicle.

2. The method of claim 1, wherein the approaching road conditions include a detected peak in the road, and comprising the further step of shifting the transmission in response to detection of said peak.

3. The method of claim 1, wherein the gear is changed from its current state if the approaching road increases in angle or a peak in the road is not detected.

* * * * *